United States Patent
Bollmann et al.

(10) Patent No.: US 6,493,043 B1
(45) Date of Patent: Dec. 10, 2002

(54) METHOD OF INCREASING THE STORAGE CAPACITY OF SERVICE INFORMATION IN A DIGITAL TV TRANSMISSIONS RECEIVER

(75) Inventors: Tilman Bollmann; Stephan Hartwig, both of Essen; Thomas Rautenberg, Bochum, all of (DE)

(73) Assignee: Nokia Technology GmbH, Pforzheim (DE)

( * ) Notice: Subject to any disclaimer, the term of this patent is extended or adjusted under 35 U.S.C. 154(b) by 0 days.

(21) Appl. No.: 09/280,142

(22) Filed: Mar. 26, 1999

(30) Foreign Application Priority Data

Mar. 27, 1998 (DE) ......................................... 198 13 784

(51) Int. Cl.$^7$ ............................. H04N 5/44; H04N 9/64; H04N 7/00; H04N 7/12; H04N 11/00; H04B 14/04; G06F 12/00; G06F 12/14; G06F 12/16

(52) U.S. Cl. ........................ 348/714; 348/716; 348/423; 348/461; 348/473; 348/553; 375/240.27; 711/132; 711/133

(58) Field of Search .................. 348/714, 718, 348/719, 423, 461, 473, 553, 725, 716; 711/132, 133; 375/240.27

(56) References Cited

U.S. PATENT DOCUMENTS

| | | | |
|---|---|---|---|
| 5,477,263 A | 12/1995 | O'Callaghan et al. | 725/102 |
| 5,479,210 A | * 12/1995 | Cawley et al. | 348/390 |
| 5,602,920 A | 2/1997 | Bestler et al. | 380/49 |
| 5,873,022 A | * 2/1999 | Huizer et al. | 455/4.2 |
| 5,909,224 A | * 6/1999 | Fung | 345/508 |
| 5,959,659 A | * 9/1999 | Dokic | 725/102 |
| 6,016,172 A | * 1/2000 | Huh | 348/845.1 |
| 6,018,765 A | * 1/2000 | Durana et al. | 709/217 |
| 6,040,867 A | * 3/2000 | Bando et al. | 348/423 |
| 6,111,612 A | * 8/2000 | Ozkan et al. | 348/465 |
| 6,122,315 A | * 9/2000 | Barnes | 375/240 |
| 6,144,400 A | * 11/2000 | Ebisawa | 348/7 |

FOREIGN PATENT DOCUMENTS

| | | |
|---|---|---|
| DE | 19650515 | 6/1998 |
| EP | 0725539 | 8/1996 |
| EP | 0772159 | 5/1997 |
| EP | 0827340 | 3/1998 |

OTHER PUBLICATIONS

"Broadcasting and Processing of Program Guides for Digital TV" S. Hartwig et al, *SMPTE Journal*, Oct. 1997, pp. 727–732.

* cited by examiner

*Primary Examiner*—John Miller
*Assistant Examiner*—Paulos M. Natnael
(74) *Attorney, Agent, or Firm*—Ware, Fressola, Van Der Sluys & Adolphson LLP (57) ABSTRACT

The invention concerns a method of increasing the storage capacity of service information data (SI) in a receiver for digital TV transmissions, such as e.g. in accordance with the MPEG 2 and the DVB standard. The increase takes place to enable keeping a larger quantity of service information data ready for recall, which is used to create the display of an interactive electronic program guide that is shown as an "On Screen Display" (OSD) on the screen. Such a program guide is designed to make the transmission choice easier and to automate the adjustment of the receiver for the desired transmission. The object of the invention is to provide a solution which makes it possible to expand the storage capacity, especially the mentioned cache area, without additional hardware. To achieve the object the unoccupied area of the image memory (MPEG-RAM) is used as a cache area by the video decoder (V-DEC) while graphic displays are shown on the full screen surface as a "Full Screen OSD". To create the electronic program guide the microcomputer ($\mu$C), which is responsible for managing the receiver, uses this cache area to buffer as large a portion as possible of the service information (SI) extracted from the receiver by a demultiplexer.

10 Claims, 7 Drawing Sheets

FIG. 1

FIG. 2
TV Display Mode

METHOD OF INCREASING THE STORAGE CAPACITY OF SERVICE INFORMATION IN A DIGITAL TV TRANSMISSIONS RECEIVER

BACKGROUND OF THE INVENTION

1. Technical Field

The invention concerns a method of increasing the storage capacity of service information data in a receiver for digital TV transmissions, such as e.g. according to the international MPEG 2 standard and the standards of the European DVB system. The purpose of the increase is to make a larger amount of service information data available for recall, which is used to create an interactive electronic program guide display shown as a so-called "On Screen Display" (OSD). Such a program guide is designed to make the transmission choice easier and to automate the adjustment of the receiver for the desired transmission. Beyond that the invention can also be used in receivers of other digital transmission systems which transmit other comprehensive information in addition to the actual payload, particularly for a user-friendly guidance.

2. Discussion of Related Art

Digital TV systems simultaneously transmit the video and audio components of several TV programs through a single transmission channel, and additional information if needed from other services by means of a transport time multiplexer. In that case the user can choose from many more programs than were available until now. This makes orientation during the program selection more difficult. Means that were used until now, such as e.g. a program guide in paper form, are not very suitable for clearly presenting the variety of programs and other applications that are offered in parallel, hereafter called services. Help is provided by including more information in the additional data, which are transmitted for control of the system by every transport multiplexer. This additional information is used to display an electronic program guide (EPG) on the screen, which offers the user a dialog for adjusting and programming the receiver.

Each receiver of digital transmissions needs control data for its technical function, such as so-called "Packet_Identifiers" (PID) among others, so that when the Packaged Elementary Streams (PES) are demultiplexed from the received transportation stream, the compressed video or audio data contained therein can be functionally assigned. These control data are transmitted as "sections" in the so-called Program Specific Information (PSI), and in the same way as the video and audio elementary streams in the payload part of each transport multiplexer. The system control used in the DVB system conforms to the international standard ISO/IEC 13818-1(1994): "Information Technology—Generic coding of moving pictures and associated audio information—Part 1: Systems" and is therefore assumed to be known. This standard makes it possible to expand the content of the Program Specific Information (PSI) in accordance with the service provider's needs by means of additional sections, so-called "Private-Sections".

This expansion is used in the DVB system. In that way the DVB signals also transmit Service Information (SI) in addition to the program specific information (PSI). The service information (SI) contains technical transmission data and particularly describes the Program Elementary Streams (PES) according to origin and content. This makes it possible to automatically tune the receiver for the desired service and provides a user-friendly guide through the variety of the transmitted services by means of the above-mentioned electronic program guide.

The structure of such a system is described in the European telecommunications standard pr ETS 300 468: "Digital broadcasting systems for television, sound and data services; Specification for Service Information (SI) in Digital Video Broadcasting (DVB) systems", 13.02.1996. In accordance with the latter the PSI data and SI data are transmitted in the same form. Thus a transport multiplexer serially transmits data packets with elementary video streams, elementary audio streams and data streams with PSI or SI data, in a sequence with variable limits. In accordance with the standards both the PSI and the SI data are arranged in the form of tables and subtables, where the tables because of their size can be distributed in several sections of different lengths. The SI tables use the syntax of the PSI standards and contain so-called "descriptors" to describe the contents and the transmission data. The contents of the SI tables can differ depending on the service provider. A significant component is the included information about services and their contribution to the programs, so-called "events" of the received distributor network and from other distributor networks. For example by means of so-called SDT "Service Description Tables" they contain data for a more detailed description of the individual services, such as among other things the name of the service and the provider, the type of service and its national or regional availability. The data in so-called EIT "Event Information Tables" is of special significance for a user-friendly program guide. These tables are provided in each transport stream for both the services of the received transport stream and for other transport streams, and in many subtables contain information about the currently running program contributions and subsequent ones, but also the corresponding time schedules for the previewing of contributions during the next hours and days including their starting times, duration, name and description of the contents. Some program providers presently transmit tables for previewing programs during the next seven days.

The magnitude of the necessary amounts of data will be briefly shown by an example. A distributor network with ten transport streams has 80 different services. If all services on the average offer 40 program contributions (events), a weekly preview must make data available for:

$$80[\text{services}] \cdot 40\text{events} \cdot 7[\text{days}] = 22,400\text{events},$$

thus about 22,400 program contributions. If each program contribution is described with 300 bytes on the average, the description of all program contributions for a week requires event information tables with a total of about 22,400·300 bytes=6.7 M-bytes. To save the user long waiting time for the desired information, it is desirable for the access time to the entire EIT data to take not more than 10 seconds. To that end it must be periodically and fully transmitted within a period which is clearly under 10 seconds. This would require a data rate of about 5 M-bit/sec just for the transmission of the EIT data. This data rate is not available because of the limited channel width of about 40 M-bit/sec maximum. The event information tables are furthermore provided with different priorities. Thus the tables for the current and subsequent events are transmitted during an essentially shorter time period than those for a complete time overview. For that reason the period for transmitting EIT data for a weekly overview can take up to 30 seconds. Since time overviews that extend beyond four days are generally only transmitted for the current transport stream, the SI data must be obtained from different transport streams. This significantly increases the access time to certain SI sections in the data stream when a weekly overview is used.

A time multiplex transmission like the MPEG 2 method, requires that the sections of the different signal or data components arrive non-continuously at the receiver, thus at different times, and after the multiplexing the data must be stored in the receiver until they are decoded or evaluated. To buffer the different elementary streams, the main control of each receiver has available a transient working memory which provides the corresponding buffer areas. For economical reasons in the past the capacity of the transient working memory was kept relatively small. A capacity of 1 M-byte is generally the standard in practice so that in addition to other tasks, only a relatively small part of about 40 K-bytes is available for service information in a so-called cache area. This area is used e.g. to provide an overview of the running and the subsequent transmissions at all times, independently of the transmission period lengths. Presently however there is already insufficient storage capacity to buffer the above-cited magnitude of EIT data. A user-friendly guidance with a time schedule of at least one week can therefore only be produced if the data that are not stored in the buffer are taken directly from the transport stream. But this can take longer than a minute of waiting time, for the indicated reasons. To correct this deficiency new receivers must be equipped with additional storage capacity, and the customer devices must be refitted with corresponding hardware. This is relatively expensive and therefore unsatisfactory.

SUMMARY OF INVENTION

The object of the invention is to present a solution which makes it possible to expand the storage capacity, particularly that of the cited cache area, without additional hardware.

The invention makes use of the knowledge that the predominant part of the image memory of the video decoder remains unused during an OSD (on screen display) on the full surface of the receiver screen. During decoding the image memory is predominantly used to predict video images, and is therefore only used to a small extent for the display on the full screen surface. Beyond that the invention utilizes the fact that certain video decoders are connected to the management of the receiver through an interface system, which also makes it possible to read the data that are located in the image memory of the video processor.

To achieve this object, the unoccupied area of the image memory is used by the video decoder as a cache area during the display of graphic pictures on the full screen surface, like those of the electronic program guide, i.e. during a so-called "Full Screen OSD". In order to create an electronic program guide, the microcomputer responsible for the management of the receiver buffers in this cache area the largest possible part of the service information that was extracted from the receiver by a demultiplexer. The microcomputer can instantly recall the parts of the buffered information desired by a user, which avoids the respective waiting time before the next transmission of the corresponding sections.

BRIEF DESCRIPTION OF THE DRAWINGS

The invention is explained in the following by means of an embodiment, where the corresponding drawings show.

DETAILED DESCRIPTION OF PREFERRED EMBODIMENTS

Figure 1:
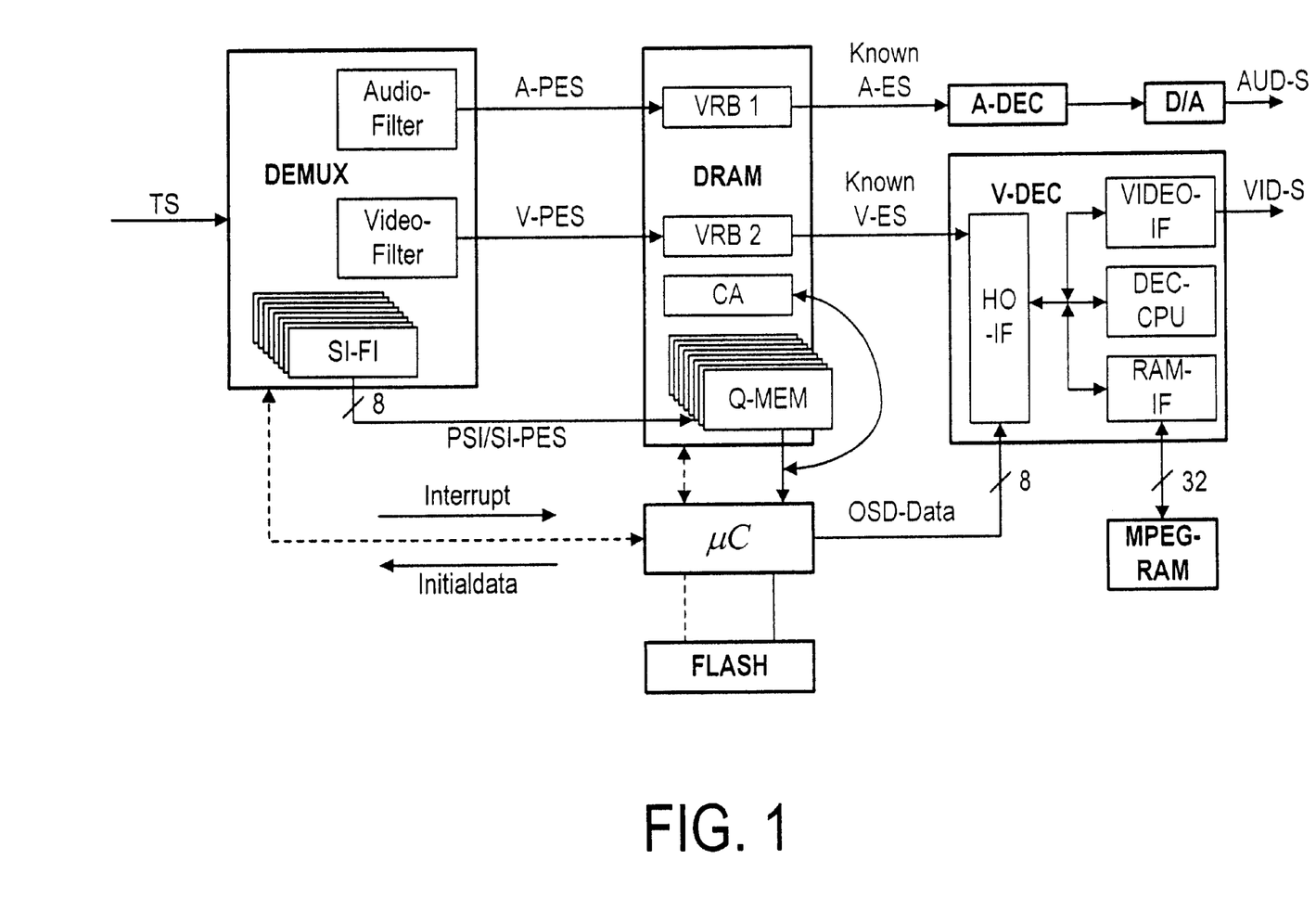
FIG. 1 the operating principle of an MPEG 2 module in a DVB receiver according to the state of the art, and the solution according to the invention during a normal DVB image presentation without the display of graphic images on the full screen.

To explain the problem on which the invention is based, the following illustrates the principle of the signal recuperation in the receiver. The receiving module of an Integrated Receiver-Decoder (IRD), in the present instance for receiving DVB transmissions, selects a multiplexer from a number of modulated transport multiplexers, which reach the receiver via different channels, e.g. via satellite or via a cable network, and demodulates it by using an error-correcting system. The MPEG module illustrated in FIG. 1 shows a known way of recuperating the signal components A-ES, V-ES of a single service from a received transport stream. By means of filters which can be adjusted by a microcomputer for the data packets of different services by means of initial data PID's, from the transport stream TS of the desired service a demultiplexer DEMUX extracts the data packets with the compressed data of the audio elementary stream A-PES and the video elementary stream V-PES. Beyond that the demultiplexer DEMUX of the present example contains eight programmable SI-FI filters for extracting sections with PSI/SI data. Among other things this can also be used to remove the data packets of different SI sections, the so-called "Private Sections", from the transport stream TS. An MPEG 2 audio decoder A-DEC converts the extracted data packets from the audio elementary stream A-PES, and a video processor respectively those of the video elementary stream V-PES, back into the original uncompressed digital signal stream. Among other things the microcomputer $\mu$C determines the initial data from the PSI data and controls the signal flow in the entire MPEG module. To that end it is connected to the mentioned transient working memory DRAM and a non-transient working memory FLASH.

To better understand the function, the signal and control lines represent the data flow between the functional groups instead of the data buses which are normally used in practice, where solid lines indicate the signal lines and broken lines the control lines. The arrows indicate the direction of the data flow. All the functional modules illustrated in FIG. 1 are initialized and controlled by the microcomputer $\mu$C, even though all the connections are not illustrated for a better overview. The microcomputer $\mu$C provides data for configuring the receiver at least for each change to another service. The microcomputer $\mu$C further implements the dialog with the user by regenerating the electronic program guide EPG and the request to the operating system.

In accordance with the MPEG 2 standard, before the transmission the DVB transmitter stores all compressed video and audio data appearing at the outlet of the MPEG encoder in variable data rates as a function of the image or the sound content, in respective buffers so that they can be transmitted as packets with a constant data rate. In addition each data packet as well as each section is preceded by a corresponding "header" and additional data for identifying information ID's and for the system management are added to the payload part, such as for example auxiliary headers, a time reference (PCR). Since the MPEG decoder does not need all these additional data, they must be partially removed before the decoding, and the original variable data rate must be restored in the elementary streams. To that end the packeted audio elementary stream A-PES is routed from the outlet of the demultiplexer DEMUX to a buffer area VRB1, and the video elementary stream V-PES into a buffer area VRB2 of the transient working memory DRAM. The microcomputer μC routes the packeted elementary streams A-PES and V-PES, with a reduced amount of data and the original variable data rate, to the MPEG 2 video decoder V-DEC or to the MPEG 2 audio decoder A-DEC.

The video decoder V-DEC illustrated in FIG. 1 is a relatively complex circuit with an independent decoder-processor DEC-CPU and an internal bus system which communicates with the remaining components of the receiver via different interface connections. In this way the compressed video elementary stream V-ES reaches the decoder V-DEC via the input interface HO-IF. The decoded and decompressed image signal is provided for image display via a video interface VIDEO-IF, e.g. on a television receiver. The decoder-processor DEC-CPU also provides the prediction of the video images. To that end it is connected via a memory interface RAM-IF to a transient image memory MPEG-RAM. The latter usually has a storage capacity of at least 2 M-bytes. Since a considerably larger data stream must be moved per unit of time between this image memory and the decoder-processor DEC-CPU than between the microcomputer μC and the working memory DRAM, the RAM interface RAM-IF has at least a 32-bit bus.

In the present example the decoder-processor DEC-CPU also performs the superimposition of graphic presentations for the TV image display, such as inserting OSD's into the image signal VID-S. It should be explicitly pointed out however that this combination of functions is not absolutely required. The microcomputer μC essentially controls the graphic displays via the input interface HO-IF, and at that time it stores the bitmaps needed for the OSD insertion in a portion of the image memory MPEG-RAM.

Like the sections of the elementary streams V-PES and A-PES, the data streams with PSI and SI data are stored temporarily. To that end a respective separate memory area Q-MEM of the transient working memory DRAM stores the selected data packets with the required PSI/SI data sections during the extraction from the transport stream TS according to the type of tables. Only selected data from the received SI data stream can be stored because of the limited storage capacity of the receiver. The selection of relevant data for the user's information during the program display is taken over by the microcomputer μC, which then transmits these in concentrated form as an SI data stream SI-DS to another area of the working memory that will subsequently be called cache area CA, to enable it to immediately write newly received EIT data to the separate memory areas Q-MEM. The limited size of the memory areas Q-MEM and the computer capacity required to extract the data extend the time needed to fill the cache by a multiple of the SI data transmission period.

In a receiver according to the present invention, the content of the cache area CA is used e.g. to constantly keep the information of the current program contribution and of the following contributions ready for recall. Immediately after the recall the latter are inserted by the user as an OSD graphic block into the display of the current program, without any waiting time. To that end, in accordance with the present invention, the cache area CA can also be decreased by comparison with the known solutions.

Figure 2:
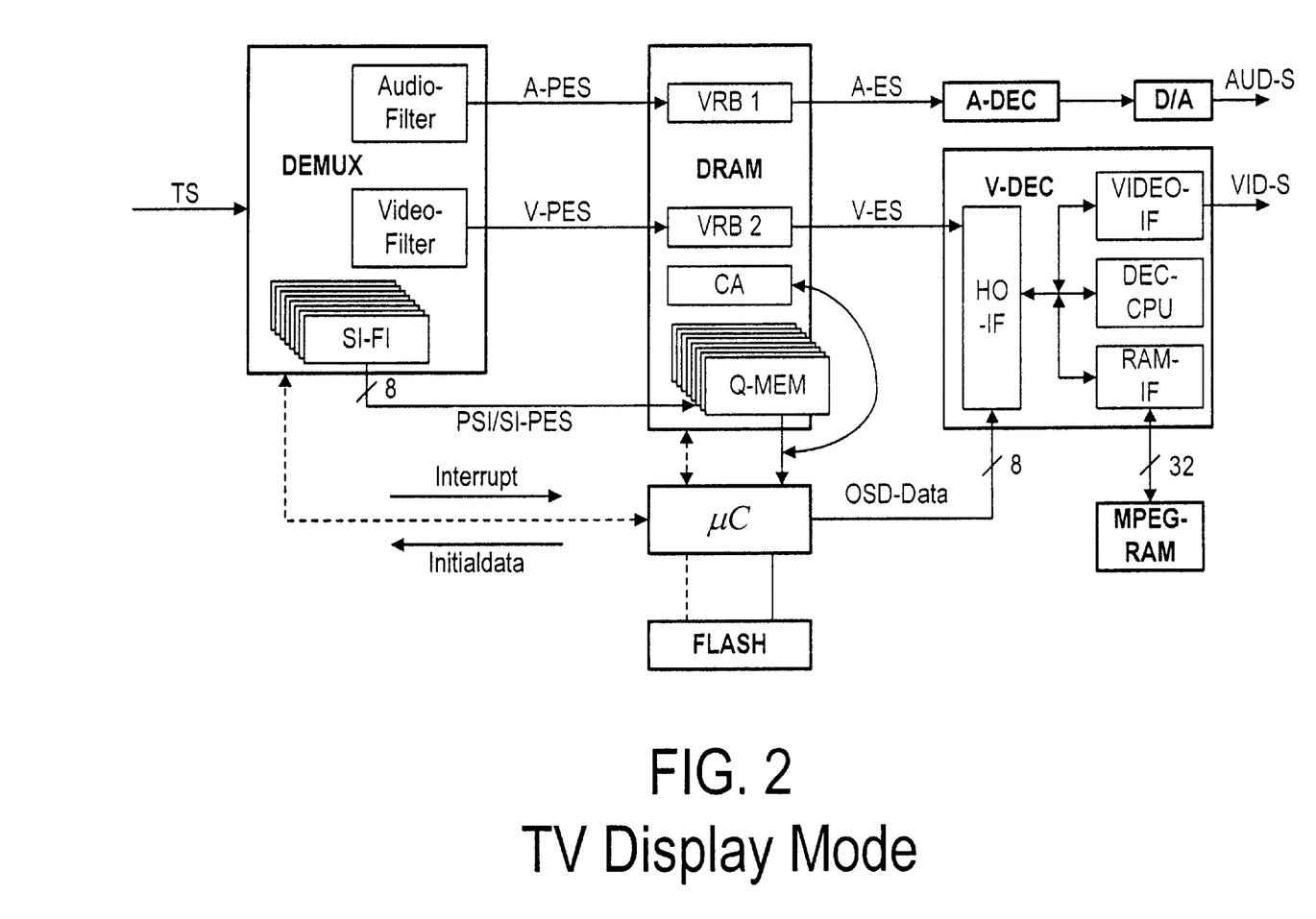
FIG. 2 diagram of the present invention in normal TV display mode (and also in OSD mode).
Figure 3:
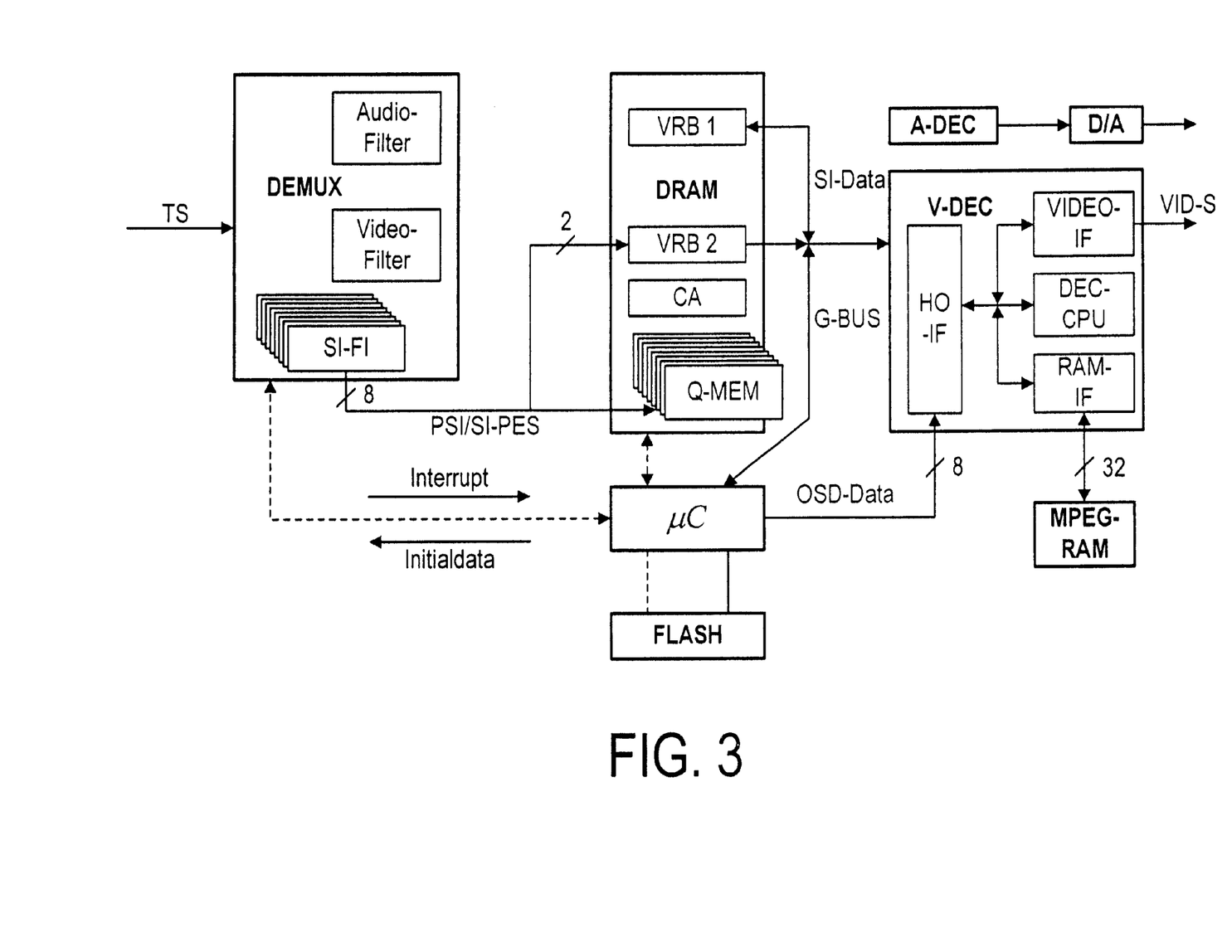
FIG. 3 diagram showing the operating principle of an MPEG module in a DVB receiver according to the invention during the display of graphic service information images on the full screen.
Figure 4:
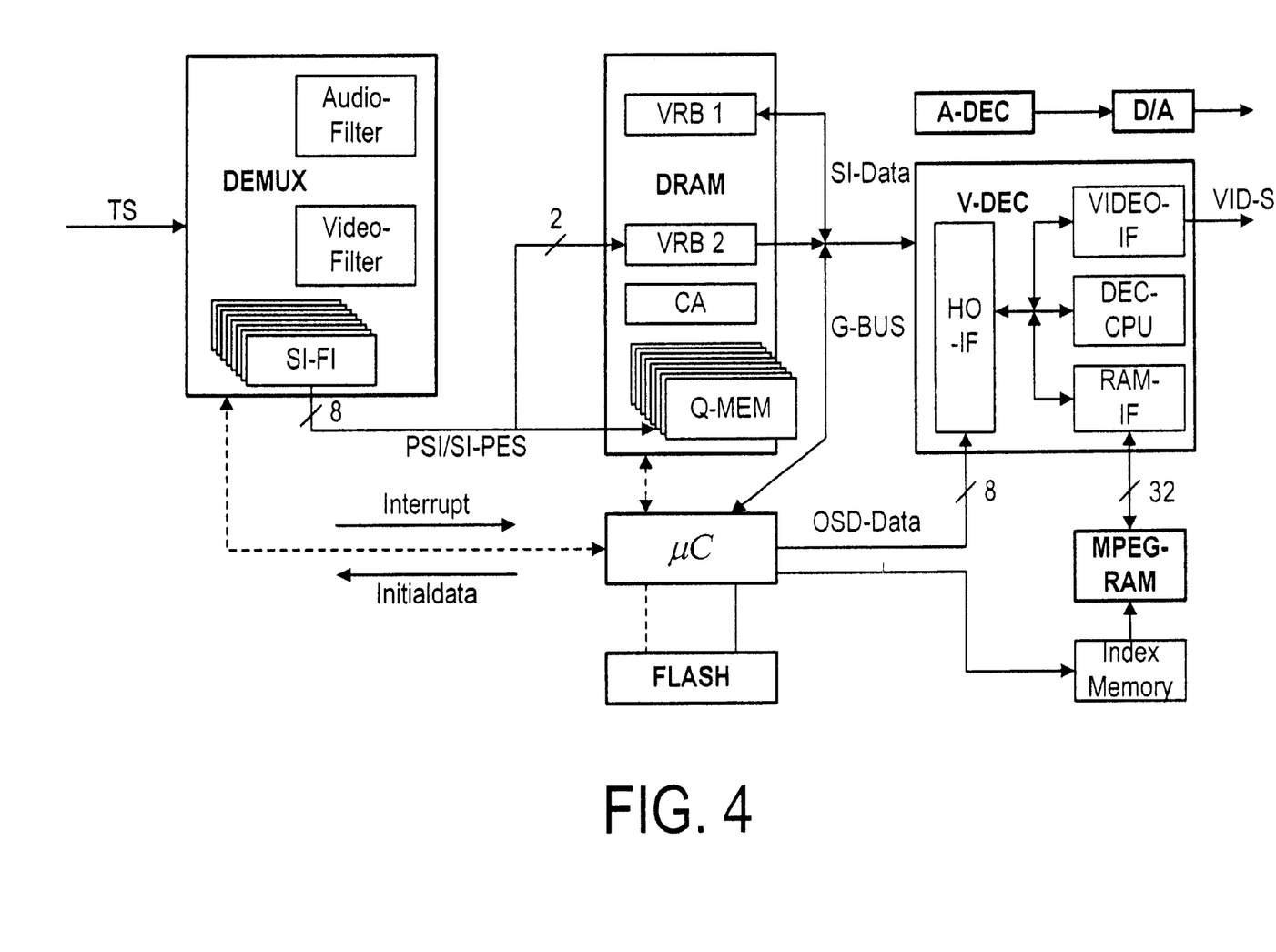
FIG. 4 illustration of an embodiment in which an index memory area is used by a microcomputer.
Figure 5:
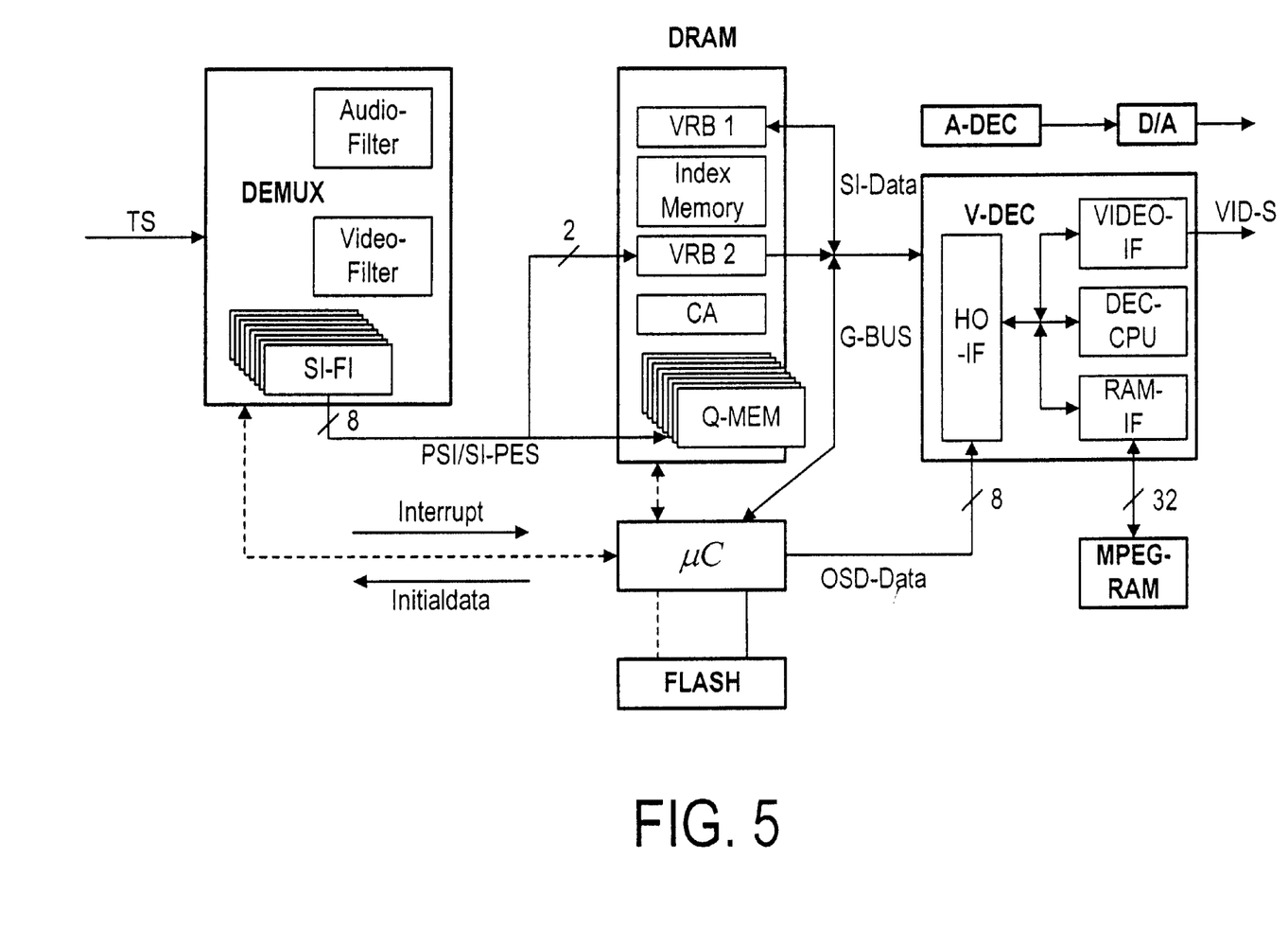
FIG. 5 illustration of an embodiment in which an index memory area is located in a transient working memory (D-RAM).
Figure 6:
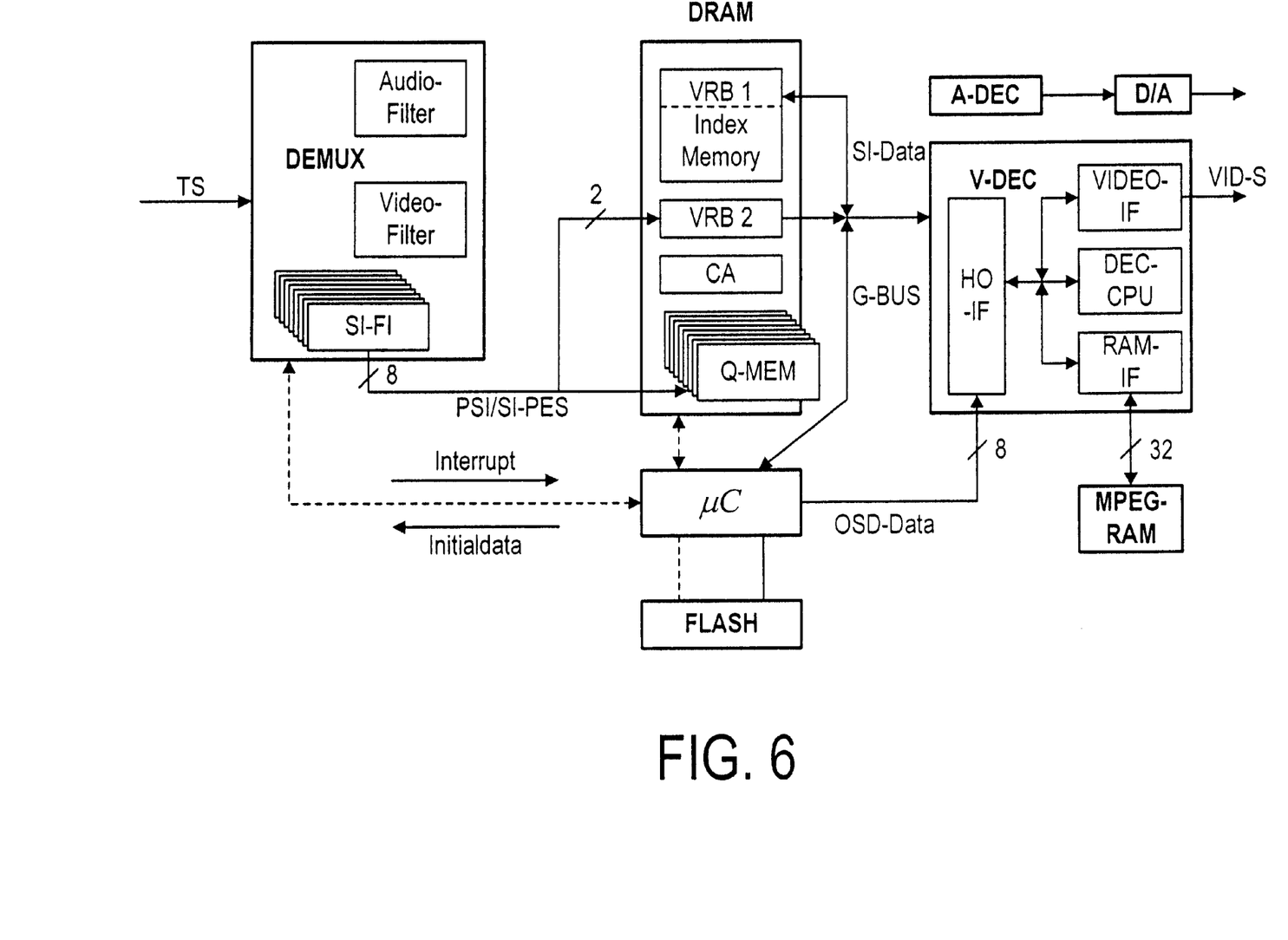
FIG. 6 illustration of a best mode embodiment in which an index memory area is located in a second buffer area (VRB 1).
Figure 7:
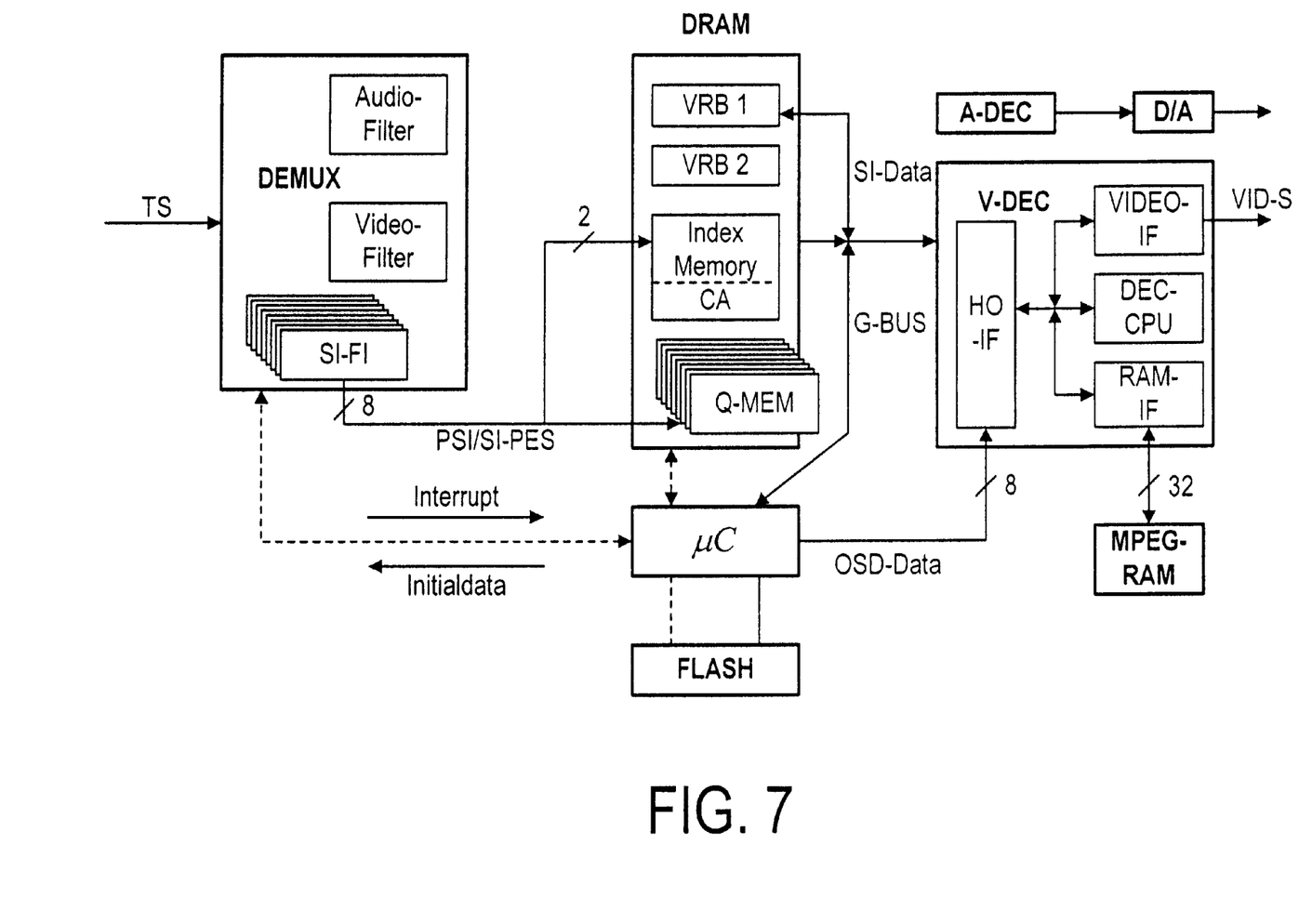
FIG. 7 illustration of a further solution in which an index memory area is located in a first cache area (CA).

To increase the cited cache area without additional hardware in accordance with the object of the invention, instead of displaying the TV transmission, at least part of the time; the present invention utilizes the full screen surface for the graphic display of the electronic program guide EPG. During the graphic display on the full screen surface, the microcomputer (μC) interrupts the decoding of the video data (V-ES) in the video decoder (V-DEC) so that an area of the image memory (MPEG-RAM) which is used for the prediction remains unoccupied. This unoccupied area is loaded with service information (SI) and is used by the microcomputer (μC) as a cache area. In the following the contingent type of operation of the receiver is called an EPG mode. The function of the EPG module during the EPG mode is illustrated in FIG. 2. It should be expressly pointed out that in accordance with the object of the invention the hardware structure of the MPEG module is not changed by comparison with the known solution. In this way the invention offers the significant advantage that any DVB receivers already in use can also be reconfigured with a corresponding software program, which is loaded into the receiver's operating system by a transport multiplexer.

Switching the receiver into the EPG mode has the advantage that during that time the video signal VID-S at the video interface VIDEO-IF of the video decoder V-DEC only contains OSD information for graphic displays which is generated in the MPEG module. Since the EPG mode is unable to display any television image, the decoder V-DEC does not need to decode any elementary stream with video data V-ES during that time. The image memory MPEG-RAM is therefore not needed to predict the images. During that time the image memory MPEG-RAM is only used for the bitmaps needed for the OSD insertion, and more than 1.5 M-bytes are therefore free. As illustrated in FIG. 2, for that reason neither the audio filter nor the video filter of the demultiplexer DEMUX are connected to the buffer areas VRB1 and VRB2 in the transient working memory DRAM. Instead at least two of the eight programmable filters SI-FI are connected to the buffer area VRB2 in order to route sections with SI data to the unused area of the image memory MPEG-RAM, instead of to the cache area CA of the working memory DRAM. One of these filters. SI-FI is programmed to extract all the sections containing "event information" tables (EITS) for a timely overview of the current transport stream TS or the other transport streams. In this way and independently of a request by a user, directly consecutive SI data with "event information" tables arriving via the transport stream TS are kept ready for recall to the extent of the memory capacity available in the image memory MPEG-RAM. Writing into the memory takes place until either the image memory MPEG-RAM is full, or the transmission period of the tables starts anew. In this way and without expanding the oftware, a large part of the image memory is available to the microcomputer μC via the input interface HO-IF as a cache area for creating the interactive program guide EPG.

Since the demultiplexer DEMUX delivers the "event information" tables at the system's transmission speed, the cache area in the image memory MPEG-RAM is able to store within one transmission period a multiple of sections with "event information" tables and subtables, as compared to the known solution. Since the access speed to these data is up to 1,500 K-bytes, after the first transmission period a considerable part of the "event information" tables, namely the stored concentrated data, can be displayed as often as desired and very fast in accordance with the user's wishes.

An index is needed to manage the addresses of the cache area in the image memory MPEG-RAM. The index is created by the microcomputer μC in its transient working memory DRAM. The buffer area VRB1 in the embodiment is used for that purpose. However this has the disadvantage that the audio decoder A-DEC has no function either during the EPG mode. To avoid this and to acoustically record the start of the next program contribution for example, the cache area CA of the working memory DRAM, which is not used during the EPG mode, can be used for the index.

What is claimed is:

1. A method of increasing the storage capacity of service information data in a receiver for digital TV transmissions, which are transmitted in the form of a transport stream (TS) with at least one packeted and compressed elementary stream having
   video data (V-PES),
   audio data (A-PES) and
   service information data (SI-PES), the method requiring that a portion of unpacked data with service information (SI) is stored in a first cache area and is graphically displayed on a part of a screen, upon a user's request, in an OSD (on screen display) mode, and the method also requiring that for displaying of normal TV transmission in a TV mode, a microcomputer (μC) transmits an unpacked elementary stream with compressed video data (V-ES) for decoding to a video recorder (V-DEC) with a separate image memory (MPEG-RAM) for prediction decoding of video images, the method being characterized in that:
   in an EPG (electronic program guide) mode, the receiver graphically displays service information (SI) as a full screen display,
   during the EPG mode, the microcomputer (μC) interrupts decoding of the video data (V-ES) in the video decoder (V-DEC), so that an area of the image memory (MPEG-RAM) which is used for prediction decoding in TV mode remains unoccupied, and
   in EPG mode, this unoccupied area is loaded with service information (SI) and is used by the microcomputer (μC) as an enlarged cache area.

2. A method as claimed in claim 1, characterized in that the first cache area (CA) for storing service information (SI) during the display of normal TV transmission in TV mode is located in a transient working memory (D-RAM) which the microcomputer (μC) manages directly.

3. A method as claimed in claim 1, characterized in that irrespective of a user's request, all sections with service information (SI) for "event information" tables which arrive in direct consecutive sequence via the transport stream (TS) are written to a second cache area in the image memory (MPEG-RAM) when there is unused memory capacity in this memory.

4. A method as claimed in claim 1, characterized in that in EPG mode the exchange of service information data (SI) takes place between the microcomputer (μC) and the image memory (MPEG-RAM) via an input interface (HO-IF) and a memory interface (RAM-IF) of the video decoder.

5. A method as claimed in claim 4, characterized in that before being written to the image memory (MPEG-RAM), the SI data are temporarily stored in a first buffer area (VRB2) which, during the display of a normal TV transmission in TV mode, is used to buffer a packeted video elementary stream (V-PES) for restoring the original transmission rate.

6. A method as claimed in claim 1, characterized in that during the graphic display of service information on the full screen surface in EPG mode, the microcomputer (μC) uses an index memory area for managing the addresses of the image memory (MPEG-RAM).

7. A method as claimed in claim 6, characterized in that the index memory area is located in the transient working memory (D-RAM) which is managed by the microcomputer (μC).

8. A method as claimed in claim 7, characterized in that the index memory area is located in a second buffer area (VRB 1) in the transient working memory (D-RAM), which during the display of normal TV transmission in TV mode is used to buffer a packeted audio elementary stream (A-PES) for restoring the original transmission rate.

9. A method as claimed in claim 2, characterized in that in EPG mode the index memory area is the first cache area (CA) in the transient working memory (D-RAM).

10. A method as claimed in claim 7, characterized in that in EPG mode the index memory area is the first cache area (CA) in the transient working memory (D-RAM).

* * * * *